United States Patent [19]

Andersen

[11] Patent Number: 4,692,860
[45] Date of Patent: Sep. 8, 1987

[54] APPARATUS FOR LOAD REGULATION IN COMPUTER SYSTEMS

[75] Inventor: Ib N. Andersen, Trångsund, Sweden

[73] Assignee: Telefonaktiebolaget LM Ericsson, Stockholm, Sweden

[21] Appl. No.: 588,796

[22] Filed: Mar. 12, 1984

[30] Foreign Application Priority Data

Mar. 18, 1983 [SE] Sweden ............................ 8301507

[51] Int. Cl.$^4$ .................. G06F 15/00; G06F 9/00; H04J 3/24
[52] U.S. Cl. .................................. 364/200; 370/60; 370/94; 340/825.5; 379/269
[58] Field of Search ... 364/200 MS File, 900 MS File, 364/300; 340/825.5, 825.51; 370/85, 60, 94; 379/112, 113, 269

[56] References Cited

U.S. PATENT DOCUMENTS

| 4,080,649 | 3/1978 | Calle et al. | 364/200 |
| 4,145,735 | 3/1979 | Soga | 364/200 |
| 4,172,284 | 10/1979 | Heinrich et al. | 364/200 |
| 4,220,990 | 9/1980 | Alles | 364/200 |
| 4,262,331 | 4/1981 | Freeland et al. | 364/200 |
| 4,481,583 | 11/1984 | Mueller | 364/200 |

Primary Examiner—Archie E. Williams, Jr.
Assistant Examiner—Thomas C. Lee
Attorney, Agent, or Firm—Roberts, Spiecens & Cohen

[57] ABSTRACT

An apparatus in a computer-controlled telecommunication system for carrying out load regulation with the aid of a queueing system for insuring that, in transmission of data information between a regional processor (RP) and a central processor (CP), all program levels in said central processor are guaranteed a positive share of the processor capacity. In the regional processor transmitter (RP) are included a transmitter memory (SM) and a ticket memory (BM). A regulator unit (R) is included in the central processor or receiver (CP) and comprises a plurality of regulator members (S-N), where each is utilized on a given program level and cooperates with a job buffer (JBB-JBN) associated with the program level. The regulator member (S) corresponds to the highest program level and the member (N) to the lowest. Each member, apart from the last one, contains three memory units (KB,KM,KK) in the form of counters. The last member (N) in the chain of regulator members contains only one counter (KB). Emptying of the paper baskets, through associated buffers, guarantees an interruption in the processing of signals on higher program levels and enables processing of signals on lower levels instead.

4 Claims, 7 Drawing Figures

APPARATUS FOR LOAD REGULATION IN COMPUTER SYSTEMS

FIELD OF INVENTION

The invention pertains to apparatus in a computer-controlled telecommunication system for carrying out load regulation with the aid of a queuing system in transferring data information between a regional processor (RP) and a central processor (CP), and for insuring that all program level in the central processor are guaranteed a positive share of the processor capacity.

BACKGROUND

A queuing method for controlling congestion, in a S.N.A. network (systems network architecture) is described in I.E.E.E. Transactions on Communications, Vol. Com-30, No. 1, January 1982. The article is entitled "Performance Analysis of the S.N.A. Virtual Route Pacing Control" and is written by Mischa Schwartz. During high traffic intensity, when a central processor is receiving the greatest number of signals it manages to dispose of at a given program level, there is obtained in the prior art an overload of the associated memory buffers on a lower level, since work is being carried out all the time at one and the same (higher) level.

SUMMARY OF INVENTION

An object of the invention is, for reasons of capacity, to relieve central processors of certain work such as relates, for example, to call signals, alarm signals, etc.

The method and apparatus provided in accordance with the invention solve the overload problem by establishing queues with the aid of so-called paper baskets which, on emptying through associated buffers, guarantee an interruption in the processing of signals on higher program levels and enable processing of signals on lower levels instead.

The method can be symbolically described with the aid of tickets, coupons and paper baskets, which are designations that are well known within the art. The counterpart of these in an apparatus are different signals and memory devices.

BRIEF DESCRIPTION OF DRAWING

The method and apparatus in accordance with the invention will next be described in detail with reference to the accompanying drawing, in which.

DETAILED DESCRIPTION

Figure 1:
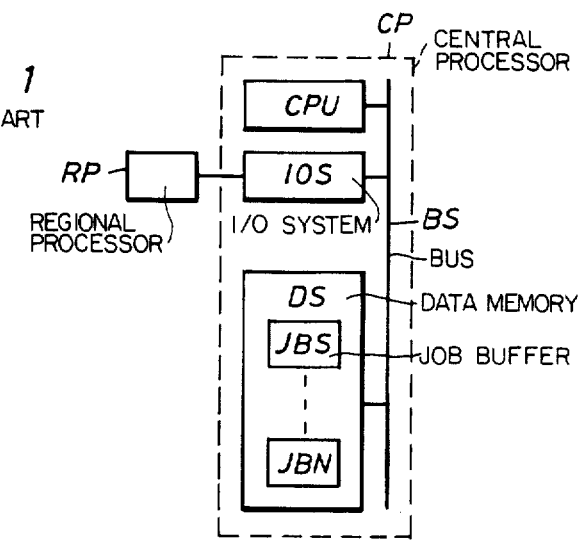
FIG. 1 is a block diagram illustrating an example of an unregulated system.

FIG. 1 illustrates an example of an unregulated system known to the art, such as, for example, that which is related to the computer part APZ210 in the stored-program controlled telephone exchange AXE10 made by LM Ericsson of Stockholm, Sweden. The system consists of a central processor CP including a control unit CPU, one or more input/output systems IOS, connected to a common data memory DS through a bus system BS. One or more external units RP (regional processors) can be connected to an IOS system, which can receive information from the unit RP, e.g. when reading test points in said unit. The IOS system can furthermore send information to the external unit RP, e.g. when writing operation points into the unit.

The IOS system forwards a signal from the unit RP to the control unit CPU by writing in a job buffer JB in the data memory DS. From the format aspect, a job consists of a header and an information part. The header identifies the job, e.g. gives the address of the unit RP. The information part contains other data, e.g. the content of the test points. A job buffer is a part of the data memory DS and is organized as a first in-first out (FIFO) queue of jobs.

The system is characterized by
the number of job buffers being at least two and
the central processor CP serving the job buffers in order of priority Serving in priority order means that the central processor CP does not read out any job from the buffer JBx as long as a buffer JBy (where $y<x$) contains a job. The central processor sends signals to the unit RP via the IOS system. The information can either be sent directly to the IOS system or via a job buffer in the data memory DS. It is assumed further to be known how the data flow from a transmitter or regional processor RP to a receiver or central processor CP can be regulated with the aid of "tickets" or "windows", e.g. in accordance with the standardized data communication protocols HDLC, X.25 and SDLC (IBM). The regulation principle is that the transmitter may have at most a given number of signals outstanding without acknowledgement (i.e., the window filled to its upper edge). As soon as the receiver is ready to receive new signals, it acknowledges the old ones (rotates the window).

Figure 2:
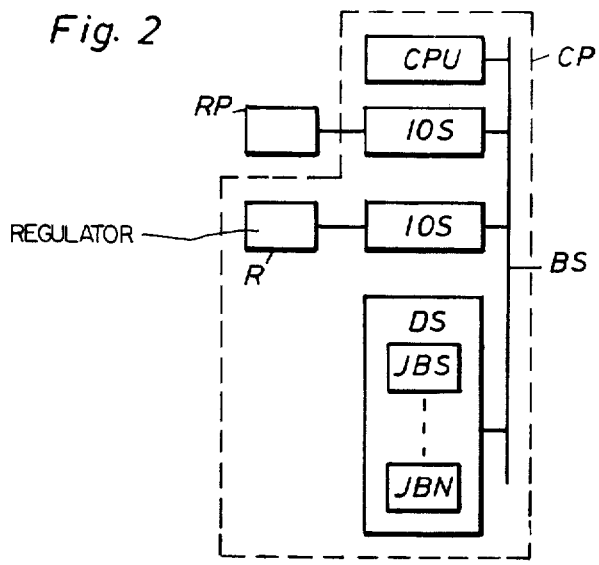
FIG. 2 is a block diagram of a system with load regulation.

FIG. 2 illustrates how the receiver CP, in accordance with the invention, is provided with a special regulator R determining at what time the processor CP (receiver) will send the acknowledgement signal to the transmitter RP (regional processor). The regulator includes a plurlity of regulator members, one for each of the job buffers JBs, JBs+1, ... JBN, where JBs denotes the buffer which receives the signals from the transmitter RP.

Figure 3:
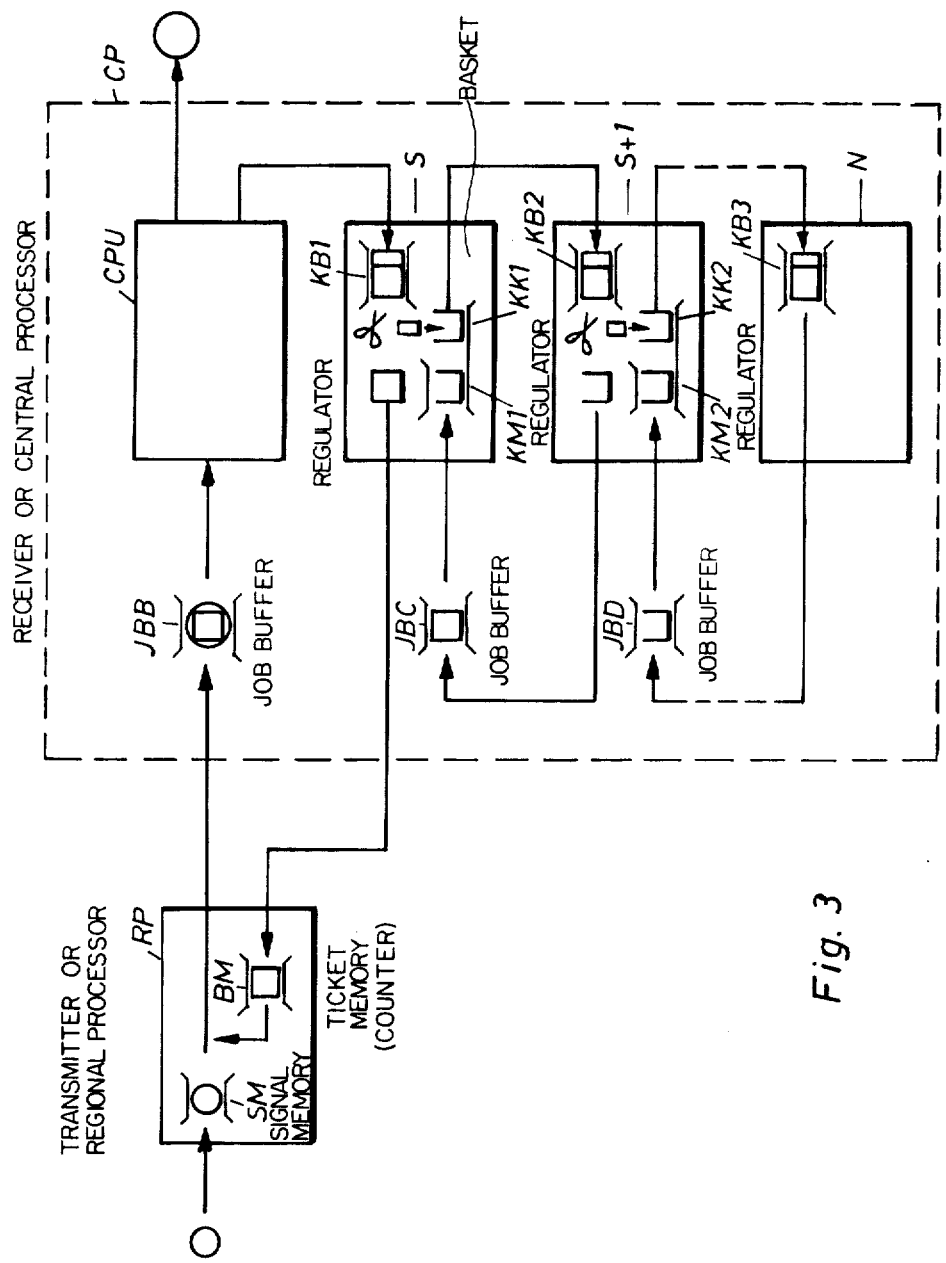
FIG. 3 is a symbolic block diagram illustrating in a simplified form the principle for load regulation with the aid of tickets, coupons and baskets.

The method provided in accordance with the invention is symbolically illustrated in FIG. 3. As will be seen from the Figure, the apparatus contains, according to the selected embodiment in a receiver CP, three job buffers JBB, JBC and JBD, each of which is utilized at a determined program level, where JBB is used at the highest level and JBD at the lowest. A regulator member is associated with each buffer, and each member contains a plurality of memory means for storing received signals. A sequence according to FIG. 3 is described below.

Signals are received and stored in a signal memory (signal queue) SM in a transmitter RP (Regional Processor). The transmitter also contains a ticket memory (ticket queue) in the form of a counter BM. The signal queue and the ticket queue are scanned, and when the condition is met with both signal and ticket occur simultaneously in an associated memory, a signal is sent with a ticket from the transmitter RP to a receiver CP (Central Processor) via a job buffer JBB in the receiver. The ticket counter BM is then stepped down by one step. The signal in the buffer JBB is processed by the receiver CP which then forwards the signal to the desired receiver and furthermore sends a ticket signal to a coupon-ticket queue KB 1, a memory in the form of a counter which is stepped up by one step for a received signal. The counter KB 1 is included in a load regulator member S which furthermore contains a coupon basket KK1, a memory in the form of a counter, as well as a basket queue KM 1, which is also a memory in the form of a counter.

On the condition that, in scanning, a signal is available both in the coupon-ticket counter KB 1 and in the basket queue counter KM 1, a ticket is sent to the ticket queue BM of the transmitter RP, the counter of the ticket queue BM being thus stepped up by one step. Furthermore, a coupon signal is sent from the counter KB 1 to the coupon KK1, the counter KB 1 being counted down one step and the counter KK1 counted up one step. The illustrated scissors are intended to illustrate clipping coupons into the coupon basket (paper basket) KK 1, in which a previously determined number of coupons can be stored. The maximum number of coupons in the paper basket determines the time for changing over from a higher to a lower program level. When the basket is full, i.e. when a predetermined number of coupons, which is ten according to the present embodiment, are read in the memory KK 1, the basket is emptied by a signal being sent from the counter KK 1 to a coupon basket queue KB 2 in the next regulator member S+1. The coupon basket queue KB 2 is also a counter, and on receipt of the signal (ticket) from the basket KK 1 it is stepped up one step. The paper basket KK 1 is set to zero in the member S, and the basket queue counter KM 1 is stepped down one step. If there is a signal in the basket queue KM 1 during scanning, this is a sign that the paper basket KK 1 is not full and the clipping of new coupons can be started. If there is no signal in the basket queue KM 1, this is a sign that no coupons can be clipped. The regulator member S+1 also contains a basket queue KM 2 and a paper basket KK 2 both consisting of counters. On condition that there is a signal simultaneously in the coupon basket queue counter KB 2 and the basket queue KM 2 during scanning of the queues, a ticket signal is sent to the buffer JBC and a coupon to the coupon basket KK 2, the counter KB 2 then being counted down one step and the counter KK 2 being counted up one step.

When the basket KK 2 is full, after ten coupons according to the embodiment, the basket is emptied by a signal from the regulator member S+1 to the buffer JBD for storing in the latter. The signal from the member S+1 passes through a third regulator member N. This is taken to be the last member in the chain of members and is not equipped as the others. The signals are forwarded via a third coupon basket counter KB 3 directly to the buffer memory JBD under control of the control unit CPU. The counter KK 2 is set to zero simultaneously and the basket queue counter KM 2 is stepped down one step. If there is a signal in the KM 2 basket queue during scanning, this means that the paper basket KK 2 is not full. If there is no signal in the KM 2 basket queue, this means that no coupons can be clipped in the memory KK 2.

The job buffers are scanned in priority order by the control unit CPU. If there is no information in the buffer JBB, it is then the turn of the buffer JBC. If the ticket signal occurs first in JBC, this signal is read out from JBC and steps the associated KM basket queue one step up. Thus when there is a signal in the KM basket queue and the condition is met that a signal is also available in the coupon-ticket queue KB, a ticket is sent to the ticket counter BM of the transmitter RP, as previously described, the counter BM then being counted up one step. The sequence is hereby terminated and starts again with transmission of a signal and ticket from the transmitter RP to the receiver CP when a signal occurs in the signal memory of the transmitter. When there is no information in the buffers JBB and JBC, it is then the turn of the buffer JBC. If a ticket signal is first available in the buffer JBC, it is read out from the buffer and steps the associated basket queue counter KM 2 one step up. Thus when there is a signal in the basket queue KM 2 and the condition is met that there is also a signal in the coupon-ticket queue KB 2, a ticket signal is sent to the buffer memory JBC.

In the buffer JBC, for example, there can be other jobs which do not affect the paper basket. The jobs are executed in turn, and it is when the turn has come to the paper basket signal that the basket queue counter KM is stepped forward. This also applies, of course, for execution of the jobs in the remaining job buffers. As will be seen from the description, ten coupons are stored in the basket KK 1 while ten baskets are stored in the basket KK 2, each of the baskets corresponding in time to ten coupons.

Program execution is enabled at all program levels with the aid of the described sequence. By suitable selection of the number of coupons in the coupon baskets, the time may be determined when work at a lower level may be started at the earliest, and thereby a suitable relationship between different levels may be obtained.

Figure 4:
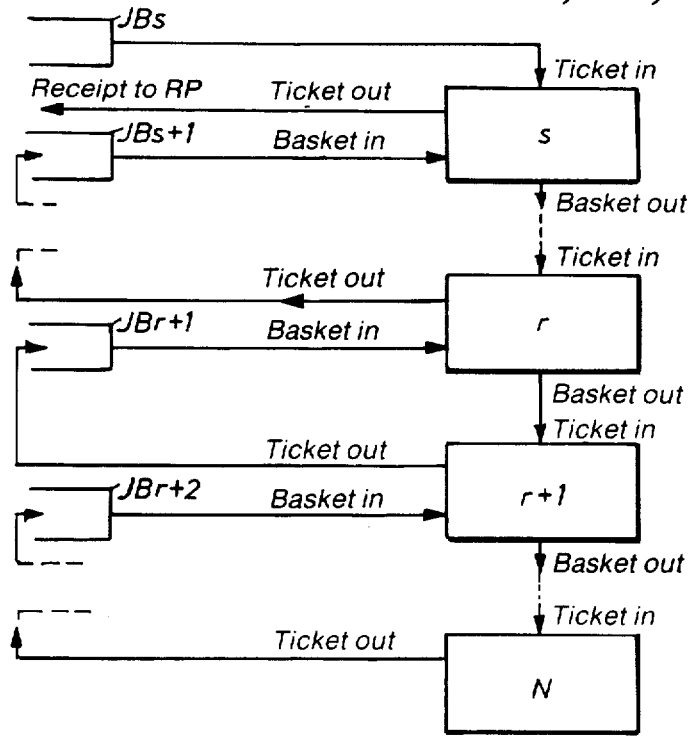
FIG. 4 illustrates a regulator in block diagram form.

FIG. 4 is a block diagram of an apparatus in accordance with the invention. A plurality of job buffers, JBs-JBN are connected to a regulator unit made up from a plurality of regulator members s-N. Each regulator member x where x<N has two inputs: "ticket in", "basket in", and two outputs: "ticket out" and "basket out". The regulator member N has a "ticket in" input and a "ticket out" output.

The inputs and outputs of the different members are connected to form a complete regulator as illustrated in FIG. 4. The dashed lines between the members s and r and between the members r+1 and N denote that more members than those drawn in can be used. The dashed lines between member r an job buffer JBs+1 and between the member N and job buffer JBr+2 denote that more job buffers than the ones drawn in can be used, since one job buffer corresponds to each member. The "ticket in" input on member s receives a "receive ticket" signal from the central processor CP when this reads out a job from the job buffer JBs which comes from the regional processor RP.

A "send ticket to RP" signal (acknowledgement signal) is sent from the "ticket out" output to the processor CP. The "basket in" input on the member s receives the "basket signal" via the job buffer JBs+1 from the output "ticket out" on the member s+1 (not shown). The "basket out" output on the member s sends the "basket" signal to the "ticket in" input on element S+1.

In the member r where s<r<N, the "ticket in" input receives the "basket" signal from the "basket out" output of the member r−1. The "ticket out" output sends the basket signal via the buffer JBr to the "basket in" input of the regulator member r−1. The "basket in" input of the member r receives the basket signal via the buffer JBr+1 from 1 the "ticket out" output of the member r+1. The "basket out" output sends the basket signal to the "ticket in" input of the member r+1. Finally, with respect to the member N the "ticket in" input receives a "basket signal", from the "basket out" output of the member N−1. The "ticket out" output sends the basket signal through a job buffer JBN to the "basket in" input of the member N−1. The sequence can be compared with that described symbolically in FIG. 3, in which fewer members participate, however.

Figure 5:
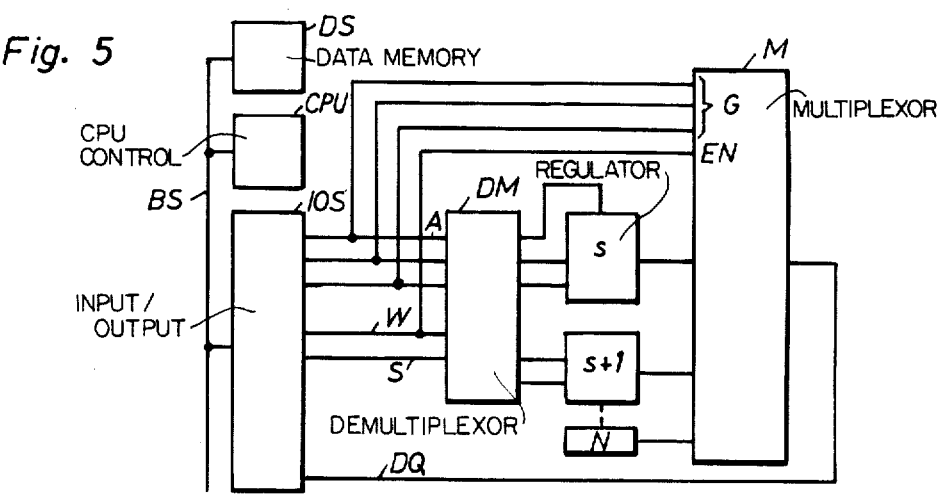
FIG. 5 is a block diagram of a system in which the apparatus provided in accordance with the invention is incorporated.

A block diagram is illustrated in FIG. 5 for a system in which the apparatus according to the invention is included. A data memory DS, e.g. of the type TMS 4044 containing a plurality of job buffers JBs-JBN, an input/output means IOS and the control unit CPU in the central processor are connected to a common information transmission bus BS. Outputs from the unit IOS are connected to the inputs of a type 74LS138 demultiplexer DM and also to the inputs of a type 74LS151 multiplexor M. The inputs of the mentioned regulator members s-N are connected to outputs of the demultiplexor DM. The outputs from the members s-N are connected to further inputs of said multiplexor M, the output of which is connected to an input DQ on input-output means IOS.

Sending out ticket signals from the regulator members to the control unit CPU via the input/output system IOS is preceded by the unit IOS scanning and reading points in the regulator. According to the illustrated embodiment, a logical one "1" means that there is a signal at the point read out. A logical zero "0" means that there is no signal. When the unit IOS reads a one at a point, it conventionally writes in a job in a job buffer. The corresponding counter is accordingly stepped down one step. Reading out symbolically corresponds to the unit IOS taking a ticket basket from the regulator and moving it to the job buffer.

As will be seen from FIG. 5, the unit IOS (properly speaking the control unit CPU through the unit IOS) writes into the regulator by:
an address being put out on the address wires a where the address points out the appropriate regulator member,
a read/write wire W is put to low level L, whereby a given input to the regulator member is pointed out,
a pulse is put on the selector wire S, whereon the addressed counter is stepped up one step.
The signals on the wires A and W set demultiplexor DM such that the pulse on the S wire goes to the "basket in" input on the correct member or to the "ticket in" wire in the member S. The wire DQ is not used in writing into the regulator.

The unit IOS reads into the regulator by:
an address being sent to the address wires A for pointing out the regulator member,
the read/write wire W being put to high level H, another input to the regulator being pointed out,
the selector wire S being activated with a pulse, whereon the ticket counter in the regulator member is stepped down and the coupon counter stepped up one step. The signals on the wires A and W set the demultiplexor DM such that the pulse on the S wire goes to the "read ticket" input on the appropriate member. The signals on the A wires furthermore set the multiplexor M such that it connects the right "ticket out" output with the wire DQ. During the time the S pulse is of low level the information from the read-out point is available on the DQ wire. When the S pulse is changed to high level, the counter of the read-off pulse is stepped down one step. If the counter is set to zero, no stepping takes places.

Figure 6:
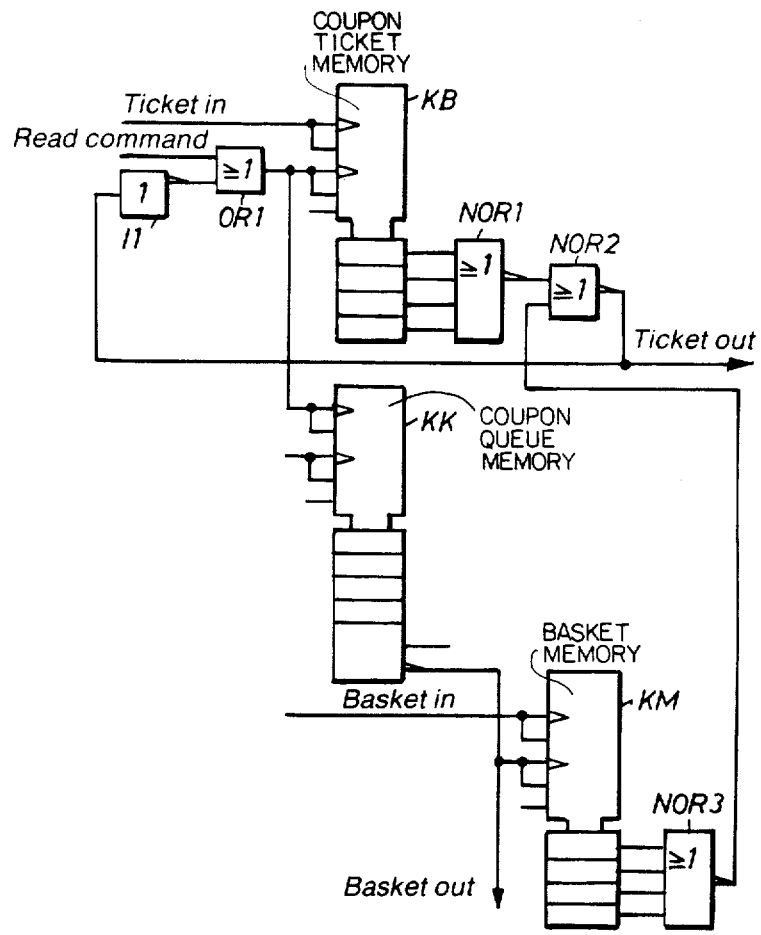
FIG. 6 illustrates how a regulator member is constructed.

FIG. 6 shows a regulator member is constructed. The illustrated member may be the member r (FIG. 4) for example, i.e. not the member corresponding to the lowest program level (N).

A coupon-ticket member KB in the form of a type 74LS193 counter receives ticket signals on its "ticket in" input in the form of pulses from either job buffers via the control unit CPU or from the "basket out" output on the preceding member. When the signal on the "ticket in" input changes level from low (L) to high (H), the counter KB is stepped up one step, corresponding to a coupon-ticket being put into the coupon-ticket memory.

A basket memory KM in the form of a type 74LS193 counter receives basket signals on a "basket in" input from the job buffer via the control unit CPU. When the signal on the "basket in" input changes level from low (L) to high (H), the counter KM is stepped up one step, corresponding to a basket being put into the basket memory. The outputs of the counter KB are connected to corresponding inputs of an NOT-OR circuit NOR 1, the output of which is connected to a first input of a second NOT-OR circuit NOR 2. The outputs of the counter KM are connected to corresponding inputs of a third NOT-OR circuit NOR 3, the output of which is connected to a second input of said NOT-OR circuit NOR 2.

If either of the counters KB or KM is set to zero, i.e. the corresponding queue is empty, the output signal from the NOT-OR circuit NOR 2 is set to low level condition (logical zero). When the counts in both both counters are separated from zero, i.e. none of the queues is empty, the output signal from the circuit NOR 2 is set to high level condition (logical one). The output from the circuit NOR 2 is connected to the input of an inverting circuit I1, the output of which is connected to one input of an OR circuit OR 1. The other input of the circuit OR 1 is a "read ticket" input, also called "read order input". The output from the circuit is connected to a second input of the counter KB and also to the input of a coupon queue memory KK in the form of a type 74LS193 counter.

When the output of the circuit NOR 2 is at low level, the read pulse to the second input of the circuit OR 1 is blocked by the output from the circuit OR 1 being put at constant high level via the inverting circuit I1. When said output from the circuit NOR 2 is low, it may be noted that the member does not give any "ticket out" when reading in the regulator member.

When the output of the circuit NOR 2 is at high level, i.e. when the regulator member desires to send a ticket signal, a zero signal is obtained on the mentioned first input to the circuit OR 1 via the invertor I1. Accordingly, blockage of the read order initiated by the IOS system on the second input of the circuit OR 1 ceases. Reading of the regulator member ticket output continues as long as the read pulse is low. The value on the counters is not changed but if the value of the counter KK show nine the "basket out" signal of the regulator member turns to low. When the mentioned read pulse goes high (assumes high level), the counter KB is stepped down one step, corresponding to a ticket being read out towards the job buffer or towards the transmitter ticket queue. The counter KK is simultaneously stepped up one step, corresponding to a coupon being clipped into the coupon basket memory. When the counter KK has arrived at the value 9 and the read order signal goes high instead, the counter is set to zero and its "basket out" signal also goes high. The counter KM is accordingly stepped down one step and the counter KB in the next regulator member is stepped up one step, corresponding to a basket having been moved from the basket queue KM to the coupon-ticket queue KB in the next member.

From what has been described, it will be seen that not until a signal is simultaneously available in the basket queue memory KM and the coupon-ticket memory KB does a ticket signal go to the respective job buffer or to the ticket queue memory BM in the transmitter RP. The next regulator member in the chain obtains, as shown, "ticket in" signals from the preceding element corresponding to a full basket (ten coupons). Each coupon in the coupon basket of the next regulator member corresponds to ten coupons in the preceding member. At the program level corresponded to by the next member, the jobs are accordingly executed in the job buffer associated with the member ten times less often than in the preceding member and buffer, corresponding to a higher program level.

Figure 7:
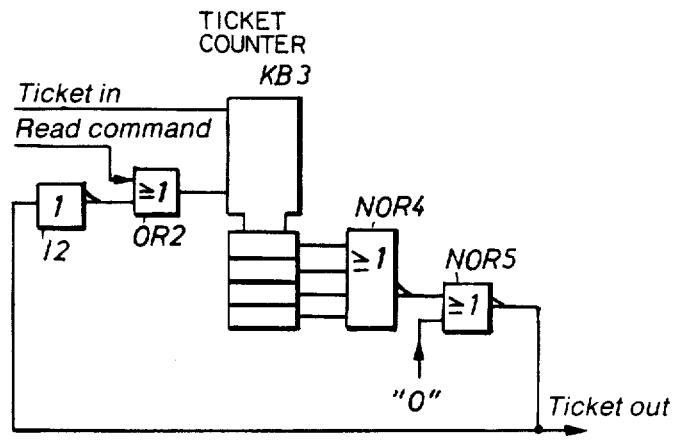
FIG. 7 illustrates the construction of a regulator member for the lowest program level N.

The content of element N is illustrated in FIG. 7, N being the element corresponding to the lowest program level. As will be seen from the figure, this member only includes a type 74LS193 ticket counter KB 3, to the outputs of which are connected corresponding inputs on a NOT-OR circuit NOR 4 (corresponding to the circuit NOR 1 in FIG. 6) the output of which is connected to the first input on a fifth NOR-OR circuit NOR 5 (corresponding to the circuit NOR 2 in FIG. 6). A constant low logical level (zero) is connected to the second input on the circuit NOR 5. From this it will be seen that the member N on the lowest program level only switches through signals from the nearest higher regulating member to the job buffer JBN. This is also symbolically apparent from FIG. 3. An OR circuit OR 2 and an inverting circuit I2 have the same function as described for the function according to FIG. 6.

As is apparent from what has been described it is possible to build out the regulator to include several program levels, it also being possible to select capacity distribution between the different program levels.

Furthermore, it is possible to arrange the regulator such that only one regulator, including a plurality of regulator members, can process information for more than one regional processor RP.

What is claimed is:

1. A computer-controlled telecommunication system comprising a regional processor adapted to transmit message signals in response to an acknowledgement signal, and a central processor which receives the message signals for processing on at least three priority program levels, said central processor including means for insuring that all priority program levels get a share of the central processor's capacity, said means comprising:

first, second and third job buffer means for storing message signals related to said priority program levels, said first job buffer means receiving message signals from the regional processor; a first priority level regulator comprising a first first-level memory means for storing ticket signals from said first job buffer means, second first-level memory means for storing basket signals received from said second job buffer means, third first-level memory means for storing the ticket signals from said first first-level memory means as coupon signals, first first-level control means responsive to the presence of the ticket and basket signals in said first and second first-level memory means respectively for transmitting a ticket signal to said third first-level memory means and a ticket signal as an acknowledgement signal to the regional processor and second first-level control means responsive to a predetermined number of coupon signals being stored in said third first-level memory means for clearing the latter, deleting a basket signal stored in said second first-level memory means, and for transmitting first carry signals; a second priority level regulator comprising a first second-level memory means for storing said first carry signals as ticket signals; second second-level memory means for storing basket signals received from said third job buffer means, third second-level memory means for storing the ticket signals received from said first second-level memory means as coupon signals, first second-level control means responsive to the presence of the ticket and basket signals in said first and second second-level memory means respectively for transmitting a ticket signal to said third second-level memory means and a ticket signal to said second job buffer means, and second second-level control means responsive to a given number of coupon signals being stored in said third second-level memory means for clearing the latter, deleting a basket signal stored in said second second-level memory means, and for transmitting second carry signals; a third priority level regulator comprising a first third-level memory means for storing second carry signals as ticket signals, and first third level-control means for transmitting a ticket signal to said third job buffer means when a ticket signal is present in said first third-level memory means; first control means associated with said first priority level regulator responsive to the absence of message signals being stored in said first job buffer for transferring a basket signal, if present, from said second job buffer means to said second first-level memory means; and second control means associated with said second regulator means responsive to the simultaneous absence of message signals in said first and second job buffer means for transferring a ticket signal, if present, from said third job buffer means to said second second-level memory means whereby said message signals are processed at said three priority program levels.

2. A system according to claim 1 wherein said first, second and third first-, second-, and third-level memory means are counters.

3. A system according to claim 1 wherein said first, second and third priority level regulators include means to regulate the execution of tasks in first, second and third orders of priority.

4. A system according to claim 1 wherein said predetermined number is ten.

* * * * *